(12) United States Patent
Holbrook et al.

(10) Patent No.: US 9,127,184 B2
(45) Date of Patent: Sep. 8, 2015

(54) POLYMERIC DISPERSANTS, DISPERSIONS, PROCESSES FOR PREPARING DISPERSIONS AND THE USE OF POLYMERIC DISPERSANTS

(71) Applicant: Fujifilm Imaging Colorants Limited, Manchester (GB)

(72) Inventors: Mark Holbrook, Manchester (GB); Alison Sherwin, Manchester (GB); Richard Williams, Manchester (GB)

(73) Assignee: Fujifilm Imaging Colorants Limited (GB)

( * ) Notice: Subject to any disclaimer, the term of this patent is extended or adjusted under 35 U.S.C. 154(b) by 0 days.

(21) Appl. No.: 14/390,534

(22) PCT Filed: Apr. 2, 2013

(86) PCT No.: PCT/GB2013/050862
§ 371 (c)(1),
(2) Date: Oct. 3, 2014

(87) PCT Pub. No.: WO2013/150289
PCT Pub. Date: Oct. 10, 2013

(65) Prior Publication Data
US 2015/0042732 A1 Feb. 12, 2015

(30) Foreign Application Priority Data
Apr. 5, 2012 (GB) .................................. 1206126.3

(51) Int. Cl.
| | | |
|---|---|---|
| G01D 11/00 | (2006.01) | |
| C09D 133/10 | (2006.01) | |
| C08F 220/18 | (2006.01) | |
| C09D 11/107 | (2014.01) | |
| C09D 11/322 | (2014.01) | |
| C09D 11/326 | (2014.01) | |
| C08F 22/10 | (2006.01) | |
| C08K 5/23 | (2006.01) | |

(52) U.S. Cl.
CPC ............ *C09D 133/10* (2013.01); *C08F 22/105* (2013.01); *C08F 220/18* (2013.01); *C08K 5/23* (2013.01); *C08K 5/235* (2013.01); *C09D 11/107* (2013.01); *C09D 11/322* (2013.01); *C09D 11/326* (2013.01)

(58) Field of Classification Search
CPC .... C09D 11/326; C09D 11/101; C09D 11/30; C09D 11/107; C08F 220/06; C08F 220/18
USPC ......... 347/86, 95, 96, 100; 106/31.13, 31, 27, 106/31.6
See application file for complete search history.

(56) References Cited

U.S. PATENT DOCUMENTS

| | | | |
|---|---|---|---|
| 5,180,425 A | 1/1993 | Matrick et al. | |
| 5,821,283 A | 10/1998 | Hesler et al. | |
| 6,369,182 B1 * | 4/2002 | Whipple et al. | ............... 526/307 |
| 6,395,805 B1 | 5/2002 | Takao | |
| 6,627,696 B1 | 9/2003 | Takao et al. | |
| 6,852,777 B1 | 2/2005 | Nakano et al. | |
| 8,556,400 B2 * | 10/2013 | Yatake et al. | .................. 347/100 |
| 8,883,401 B2 * | 11/2014 | Matsuura et al. | .......... 430/278.1 |
| 2003/0050361 A1 | 3/2003 | Wang et al. | |
| 2004/0061753 A1 | 4/2004 | Chen et al. | |
| 2005/0090599 A1 | 4/2005 | Spinelli | |
| 2006/0052480 A1 | 3/2006 | Mizushima et al. | |
| 2007/0263054 A1 | 11/2007 | Yatake et al. | |
| 2007/0299198 A1 | 12/2007 | Spinelli | |
| 2008/0071007 A1 | 3/2008 | Spinelli | |
| 2010/0143589 A1 | 6/2010 | Spinelli et al. | |
| 2011/0169900 A1 | 7/2011 | Annable et al. | |
| 2011/0216125 A1 | 9/2011 | Jackson et al. | |
| 2013/0286119 A1 | 10/2013 | Cordwell et al. | |

FOREIGN PATENT DOCUMENTS

GB 2354765 A 4/2001

OTHER PUBLICATIONS

International Preliminary Report on Patentability dated Oct. 16, 2014, issued from corresponding PCT/GB2013/050862.

* cited by examiner

*Primary Examiner* — An Do
(74) *Attorney, Agent, or Firm* — Banner & Witcoff, Ltd.

(57) ABSTRACT

A polymeric dispersant obtained or obtainable by copolymerizing a monomer composition comprising at least the components: i) benzyl (meth)acrylate; ii) propylene glycol (meth)acrylate; wherein the weight ratio of component i) to component ii) is greater than 10:1.

24 Claims, No Drawings

POLYMERIC DISPERSANTS, DISPERSIONS, PROCESSES FOR PREPARING DISPERSIONS AND THE USE OF POLYMERIC DISPERSANTS

RELATED APPLICATION DATA

This application is a National Stage Application under 35 U.S.C. 371 of co-pending PCT application PCT/GB2013/050862 designating the United States and filed Apr. 2, 2013; which claims the benefit of GB application number 1206126.3 and filed Apr. 5, 2012 each of which are hereby incorporated by reference in their entireties.

TECHNICAL FIELD

This invention relates to polymeric dispersants, it further relates to dispersions comprising the polymeric dispersant, a particulate solid (especially a pigment) and a liquid medium. These dispersions are especially suitable for preparing ink jet printing inks. The present invention also relates to a process for preparing said dispersions and to the use of the polymeric dispersants for preparing ink jet printing inks. The dispersants described in the present invention are especially suited to the stable dispersion of yellow pigments (e.g. C.I. Pigment Yellow 74 and C.I. Pigment Yellow 155).

BACKGROUND

Inks are often of one of two types, depending on the type of colorant used. Dye-based inks often comprise a dye dissolved in a liquid vehicle. Pigment inks comprise a pigment dispersed in a particulate form in a liquid vehicle. Pigment inks tend to have better ozone-fastness and light-fastness than dye-based inks. However, because the pigment is in the form of fine particles there is a tendency for the particles to agglomerate or flocculate whilst the ink is being stored and/or whilst the ink is being used (e.g. printed). Such agglomeration or flocculation before the ink has been printed onto a substrate is highly undesirable, particularly in ink jet printing inks where the printer nozzles are very small and are susceptible to blockage by any oversized particulate matter. Thus, in the ink jet field a great deal of effort has been spent attempting to provide sub micron sized pigment dispersions and increase the colloidal stability of these pigment dispersions.

It is also desirable to provide pigment inks which offer high optical density (OD), especially when printed onto plain paper.

Pigment dispersions are often colloidally stabilised by means of a dispersant.

It is desirable that a dispersant is effective in the dispersion or comminution process. Quicker comminution (e.g. milling) to submicron particles sizes saves substantial energy and it may also result in less pigment particles having a particles size markedly smaller than the target size. Particles much below the target size are often referred to as fines.

Pigment based inks when printed onto a substrate often produce final images that are not firmly secured to the substrate surface. Prints from pigment based inks often exhibit poor rub fastness, water-fastness or highlighter smear fastness.

In our own studies C.I. Pigment Yellows and especially C.I. Pigment Yellow 155 and C.I. Pigment Yellow 74 have proved to be particularly difficult to disperse to a suitably small particle size for preparing ink jet printing inks. In our studies the milling times required for the preparation of C.I. Pigment Yellow 74 dispersions with an average particle size of around 100 nm can often be twice as long as those for cyan, magenta and black pigments at the same average particle size. This represents a substantial cost in providing the required milling energy.

It is known that dispersions of C.I. Pigment Yellow 74 pigments tend to have relatively poor colloidal stability resulting in flocculation, particle size growth and sedimentation whilst being stored and/or whilst in the printer. Such is recognised by for example PCT patent publication WO 2010/068776.

In our studies we have seen that the colloidal instability of the dispersions are more pronounced at elevated storage temperatures, over longer storage times and in liquid vehicles which contain smaller proportions of water relative to water-miscible organic liquids.

The above problems limit the performance and adoption of C.I. Pigment Yellows in ink jet printing inks.

Commercially, there still remains a need for dispersants which can be used to prepare pigment inks (especially inks containing the pigments C.I. Pigment Yellow 74 and 155) which solve, at least in part, one or more of the abovementioned problems.

DETAILED DESCRIPTION

According to a first aspect of the present invention there is provided a polymeric dispersant obtained or obtainable by copolymerising a monomer composition comprising at least the components:
i) benzyl (meth)acrylate;
ii) propylene glycol (meth)acrylate;
wherein the weight ratio of component i) to component ii) is greater than 10:1.

DEFINITIONS

Unless stated to the contrary, in the present patent the words "a" and "an" are meant to include the possibility of using one or more of that item.

Component i) Benzyl (Meth)Acrylate

Benzyl (meth)acrylate has the structure:

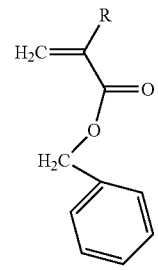

wherein R is H or more preferably methyl.

Component i) may comprise benzyl methacrylate, benzyl acrylate or a mixture thereof. Preferably, component i) comprises benzyl methacrylate. In a more preferred case component i) is benzyl methacrylate.

Preferably, component i) is present in at least 40, more preferably at least 50, even more preferably at least 55, especially at least 60 and even more especially at least 65 parts and most especially at least 70 parts by weight.

Preferably component i) is present at no more than 95, more preferably no more than 90 and especially no more than 85 parts by weight.

Especially preferred ranges for the amounts of component i) are 40 to 95, 50 to 90, 60 to 90, 65 to 90 and 70 to 90 parts by weight. Preferably, these parts represent the amounts of benzyl methacrylate.

Component ii) Propylene Glycol (Meth)Acrylate

Propylene glycol (meth)acrylate exists in a number of isomeric forms all of which are covered by the descriptions and claims herein.

2-hydroxypropyl (meth)acrylate and propylene glycol mono(meth)acrylate are also names commonly attributed to the same monomer.

Preferably, propylene glycol (meth)acrylate comprises, more preferably is one or both of the isomeric structures indicated directly below:

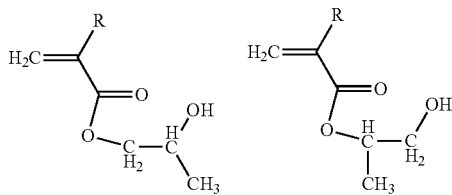

wherein R is H or more preferably $CH_3$.

Materials for component ii) often tend to be mixtures of these two propylene glycol (meth)acrylate isomers.

Propylene glycol (meth)acrylate preferably comprises or is the isomeric structure:

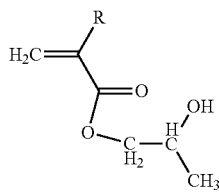

wherein R is H or more preferably $CH_3$. Preferably, this isomeric structure accounts for more than 10%, more preferably more than 25% and especially more than 50% by weight of all the propylene glycol (meth)acrylate isomers present.

Component ii) may comprise propylene glycol methacrylate, propylene glycol acrylate or a mixture thereof. Preferably, component ii) comprises propylene glycol methacrylate. In a more preferred case component ii) is propylene glycol methacrylate.

Preferably, component ii) is present at no more than 9, more preferably no more than 8, even more preferably no more than 7, especially no more 6.5 and most especially no more than 6 parts by weight.

Preferably component ii) is present in at least 0.1, more preferably at least 1, even more preferably at least 2, especially at least 3 and most especially at least 4 parts by weight.

Especially preferred ranges for the amounts of component ii) are 0.1 to 9, 1 to 8, 2 to 8, 3 to 8 and 4 to 7 parts by weight.

Preferably, these parts represent the amounts of propylene glycol methacrylate (including all the abovementioned isomeric forms).

Optional Components in the Monomer Composition

The monomer composition may additionally comprise one or more further monomers.

The further monomers are preferably ethylenically unsaturated monomers other than those already mentioned in components i) and ii).

The further monomers may be one or more hydrophilic or hydrophobic monomers. Combinations of both further hydrophilic and hydrophobic monomers may be present in the monomer composition.

iii) Hydrophilic Further Monomers

Preferred hydrophilic further monomers have one or more hydrophilic groups. The hydrophilic groups may be non-ionic or more preferably ionic.

Non-ionic hydrophilic groups include polyethyleneoxy (ended in hydroxy or alkyl chains). Examples of which include polyethyleneglycol (meth)acrylates. Preferably, if such monomers are present they account for less than 10 part, more preferably less than 5 parts, especially less than 2 parts by weight, more especially no monomer used in the preparation of the dispersant has polyethyleneoxy groups. Preferred polymeric dispersants do not have polyethyleneoxy groups because we have seen that these groups tend to reduce the final optical density of the printed images.

Preferably, the monomer composition further comprises iii) one or more ethylenically unsaturated hydrophilic monomers each having one or more ionic groups.

The ionic groups may be anionic or cationic. Examples of anionic groups include phosphonic acid, phosphoric acid, sulfonic acid and especially carboxylic acid groups. These may be in the free acid, salt form or a combination thereof. Suitable salt forms include those with the alkali metal ions (especially sodium potassium and lithium), ammonium, substituted ammonium and alkanolammonium ions.

Preferably, the hydrophilic further monomers have a calculated Log P value of less than 1. Preferably the calculated Log P value is from less than 1 to –6, more preferably from less than 1 to –3.

A review by Mannhold, R. and Dross, K. (Quant. Struct-Act. Relat. 15, 403-409, 1996) describes 14 methods for calculating Log P values of compounds and especially drugs. From this review we prefer the "fragmental methods" and especially the fragmental method implemented by ACD labs software. The calculated Log P of a monomer may be calculated using commercially available computer software, for example using the Log P DB software version 7.04 or a later version of such software (which is available from Advanced Chemistry Development Inc (ACD labs)). Any ionic or ionisable groups are calculated in their neutral (unionised) form. A lower log P value corresponds to a more hydrophilic monomer.

Preferred hydrophilic further monomers have a solubility in water at 25° C. of at least 5% by weight, more preferably at least 10% by weight. For the purposes of determining the solubility the monomer is 100% neutralised with potassium hydroxide in the case or anionic groups and nitric acid in the case of cationic groups.

Preferred hydrophilic further monomers include beta carboxylethyl acrylate, itaconic acid, maleic acid, fumaric acid, crotonic acid, more preferably acrylic acid and especially methacrylic acid. Preferably, component iii) in the monomer composition is or comprises methacrylic acid.

Preferably, the monomer composition additionally comprises a further hydrophilic monomer in an amount of at least 0.1, more preferably at least 1, even more preferably at least 2, especially at least 4, more especially at least 6 and even more especially at least 8 parts and most especially at least 10 parts by weight.

Preferably, the monomer composition comprises no more than 35, more preferably no more than 30, even more preferably no more than 25 and especially no more than 20 parts and most especially no more than 15 parts by weight of hydrophilic further monomer.

Preferably, the monomer composition comprises from 0.1 to 35, more preferably from 1 to 35, even more preferably from 4 to 30 and especially from 6 to 25, even more especially from 10 to 25 and most especially from 10 to 15 parts by weight of further hydrophilic monomers. Preferably, these are the amounts of methacrylic acid present in the monomer composition.

iv) Hydrophobic Further Monomers

Preferred hydrophobic ethylenically unsaturated monomers are those having one or more hydrophobic groups. Preferred hydrophobic groups include alkyl, aryl, siloxane or fluoroalkyl groups.

Preferably, the further hydrophobic monomers have no hydrophilic groups whether ionic or non-ionic. For example, they are preferably free of any ionic or polyethyleneoxy groups as mentioned previously.

Preferably, the hydrophobic ethylenically unsaturated monomers have a calculated Log P value of at least 1, more preferably from 1 to 6, especially from 1 to 4.

Preferred hydrophobic further monomers have a solubility in water at 25° C. of less than 5% by weight, more preferably less than 2% by weight.

Preferred hydrophobic ethylenically unsaturated monomers are styrenic monomers (e.g. styrene, alpha methyl styrene), aromatic (meth)acrylates (other than benzyl acrylate and benzyl methacrylate), $C_{1-30}$-hydrocarbyl (meth)acrylates, butadiene, isoprene, (meth)acrylates containing poly ($C_{3-4}$alkylene oxide groups, (meth)acrylates containing alkylsiloxane or fluorinated alkyl groups and vinyl naphthalene.

Preferably, the monomer composition comprises no more than 50 parts, more preferably no more than 30 parts, even more preferably no more than 10 parts, especially no more than 2 parts and most especially 0 parts of these further hydrophobic monomers.

Preferably the monomer composition comprises no more than 10 parts, more preferably no more than 5 parts, especially no more than 2 parts and most especially 0 parts by weight of macromonomers by weight. Examples of macromonomers which are preferably absent include polyalkyleneoxy (meth) acrylates, styrenic macromonomers and polysiloxy containing macromonomers.

Preferred Monomer Compositions

In view of the foregoing a preferred monomer composition comprises:
i) 40 to 95 parts, more preferably 60 to 90, especially 70 to 90 parts of benzyl methacrylate;
ii) 0.1 to 9 parts, more preferably 2 to 8, especially 4 to 7 parts of propylene glycol methacrylate;
iii) 1 to 35 parts, more preferably 6 to 25, especially from 10 to 15 parts of methacrylic acid;
iv) 0 to 50 parts, more preferably 0 to 30 parts, especially 0 to 10 parts of further hydrophobic monomers;
wherein all the parts are by weight and the ratio of component i) to ii) is greater than 10:1.

In all cases the sum of the parts of all the monomers in the monomer composition preferably adds up to 100 parts by weight. In such a case the number of parts of the monomer components equates to percentages by weight relative to the entire monomer composition.

Ratio of Component i) to Component ii)

Preferably, the weight ratio of component i) to component ii) is from 11:1 to 100:1, more preferably from 11:1 to 50:1, especially from 11:1 to 25:1, more especially from 11:1 to 20:1 and most especially from 11:1 to 16:1.

The inventors were surprised by the present invention, in that:

i) propylene glycol (meth)acrylate does not have a sterically stabilising polymeric chain as found in polypropylene glycol (meth)acrylate and so it was unexpected to find that it provided polymeric dispersants offering dispersions with such good colloidal stability.
ii) dispersions having good colloidal stability are achieved even with difficult pigments such as C.I. Pigment Yellow 155 and 74.
iii) the amounts of propylene glycol (meth)acrylate in the polymeric dispersant required to gain sufficiently beneficial improvements in colloidal stability are unexpectedly low.
iv) the milling times required to prepare dispersions of C.I Yellow 155 and 74 are unexpectedly short.

Polymeric Dispersant Characteristics

Preferably, the polymeric dispersant has a weight averaged molecular weight of less than 100,000, more preferably less than 50,000 and especially less than 40,000 g per mole.

Preferably, the polymeric dispersant has a weight averaged molecular weight of at least 1,000, more preferably at least 5,000 and especially at least 10,000 g per mole.

The molecular weight is preferably measured by gel permeation chromatography (GPC). The molecular weight standards employed are preferably polyethylene glycol or more preferably polystyrene. The eluent used for GPC is preferably dimethyl formamide (DMF), tetrahydrofuran (THF) or acetone. Of these DMF is preferred.

The polymeric dispersant preferably has an acid value of from 0.5 to 4 mmoles, more preferably 0.5 to 3 mmoles, especially from 1 to 3 mmoles, even more especially from 1.0 to 2.5 mmoles and most especially from 1.2 to 2 mmoles per g of dispersant.

The acid value may be calculated from the monomer composition. Alternatively the acid value may be experimentally determined by titration.

Preferably, the only acid groups in the polymeric dispersant which provide the abovementioned acid value are phosphonic and/or carboxylic acid, more preferably carboxylic acid groups.

The polymeric dispersant may be branched or partially cross-linked but is preferably linear (prior to the optional cross-linking mentioned below).

The polymeric dispersant may have a block, graft or more preferably a random structure with regard to the distribution of the monomer repeat units.

The polymeric dispersant is preferably soluble in water. Preferably, by soluble we mean at least 5% by weight, more preferably at least 10% by weight and especially at least 20% by weight soluble in water. For measuring solubility the preferred temperature of the water is 25° C. Any ionic groups are preferably neutralised to 100% as mentioned above. In the case of anionic groups the preferred neutralising agent is potassium hydroxide, in the case of cationic groups the preferred neutralising agent is nitric acid. To properly dissolve the dispersants of the present invention heat may be required as the dissolution process can be kinetically very slow. Thus, a preferred method for testing the solubility is to first heat a mixture of the dispersant, water and any neutralising agent if needed to 80° C. for 2 hours and then to cool the mixture to 25° C. and assess the solubility after a period of 24 hours at 25° C.

Preparation of the Polymeric Dispersant

The polymeric dispersants may be made by any suitable means. Examples of suitable polymerisation approaches include cationic, anionic, group transfer and free radical polymerisation.

A preferred method is free radical polymerisation. Suitable free radical polymerisation methods include suspension, emulsion, bulk and preferably solution polymerisation.

Preferably, the dispersant is prepared by the solution polymerisation of the above monomer composition in the presence of an aqueous or organic liquid carrier. Suitable organic liquid carriers include alcohols, ketones, ethers, amides and glycols.

Suitable free radical initiators include azos and peroxides.

The polymerisation is preferably performed with one or more chain transfer agents. These help in achieving the preferred low molecular weights. Preferred chain transfer agents are thiols.

Dispersion

According to a second aspect of the present invention there is provided a dispersion comprising a particulate solid, a liquid medium and a polymeric dispersant according to the first aspect of the present invention.

The particulate solid in the dispersion preferably has a Z-averaged particle size of from 30 to 300 nm, more preferably from 50 to 200 nm, especially from 60 to 150 nm and most especially from 70 to 120 nm. The particle size is preferably measured by a light scattering device especially a Malvern Zetasizer™.

Preferably, the dispersion comprises:
i) 0.1 to 40 parts, more preferably 0.1 to 20 parts of the polymeric dispersant;
ii) 0.1 to 40 parts, more preferably 0.1 to 20 parts of the particulate solid;
iii) 50 to 99.8, more preferably 60 to 99.8 parts of the liquid medium;
wherein the sum of the parts i) to iii) is 100 parts and all parts are by weight.

Preferably, the polymeric dispersant is at least partially adsorbed onto the surface of the particulate solid. In this way the polymeric dispersant best acts so as to colloidally stabilise the particulate solid.

The amount of polymeric dispersant in the dispersion (or ink) is preferably from 1 to 150%, more preferably from 1 to 70%, especially from 5 to 70% and more especially from 10 to 60% by weight based on the weight of particulate solid.

In a further aspect of the present invention there is provided a process for preparing a dispersion according to the second aspect of the present invention which comprises dispersing, especially comminuting, a composition comprising the polymeric dispersant according to the first aspect of the present invention, a particulate solid and a liquid medium. Dispersion processes include stirring, blending, shaking as well as milling and ultrasonication, etc.

By the word comminute we mean only those processes which tend to significantly reduce the particle size of the particulate solid. Comminution includes for example ultrasonication, bead milling, microfluidizing and high pressure homogenising. Comminution does not include low shear dispersion processes such as stirring, shaking, tumbling and the like.

Further dispersants other than those according to the first aspect of the present invention may also be present during the preparation of the dispersion. If such further dispersant are present during the preparation of the dispersion they are preferably present in less than 50%, more preferably less than 25%, especially less than 10% and most especially less than 5% by weight relative to all the dispersant present.

Preferably, the polymer according to the first aspect of the present invention is the only dispersant present during the dispersion or comminution step.

Particulate Solid

The particulate solid may be of any kind. Preferably the particulate solid is a colorant, especially a pigment. The pigment may comprise and preferably is an inorganic or organic pigment material or mixture thereof which is insoluble in the liquid medium. By insoluble we mean having a solubility of no more than 1%, more preferably no more than 0.1% by weight in the liquid medium. The solubility is preferably measured at a temperature of 25° C. The solubility is preferably measured at a pH of 8. Preferably, the solubility is measured in water, more preferably deionized water.

The pigment may be organic or inorganic.

Preferred pigments include, for example any of the classes of pigments described in the Third Edition of the Colour Index (1971) and subsequent revisions of, and supplements thereto, under the chapter headed "Pigments".

Examples of organic pigments are those from the azo (including disazo and condensed azo), thioindigo, indanthrone, isoindanthrone, anthanthrone, anthraquinone, isodibenzanthrone, triphendioxazine, quinacridone and phthalocyanine series, especially copper phthalocyanine and its nuclear halogenated derivatives, and also lakes of acid, basic and mordant dyes. Preferred organic pigments are phthalocyanines, especially copper phthalocyanine pigments, azo pigments, indanthrones, anthanthrones, and quinacridones.

Preferred inorganic pigments include carbon black (especially gas blacks), titanium dioxide, silicon dioxide, aluminium oxide, iron oxides and sulfides.

For ink jet especially suitable pigments are carbon blacks, C.I. Pigment Red 122, C.I. Pigment Blue 15:3 and C.I. Pigment Yellow 74 or 155. Of course there are many alternative pigments.

The pigment is preferably not surface treated so as to covalently bind water-dispersing groups onto its surface. Preferably, the pigment is not dispersible in water without the aid of a dispersant.

We have found that the dispersants according to the first aspect of the present invention are especially useful for dispersing C.I. Pigments Yellows.

Examples of suitable C.I. Pigment Yellows include 1, 2, 3, 5, 6, 10, 12, 13, 14, 16, 17, 62, 65, 73, 74, 75, 81, 83, 87, 90, 93, 94, 95, 97, 98, 99, 100, 101, 104, 106, 108, 109, 110, 111, 113, 114, 116, 117, 120, 121, 123, 124, 126, 127, 128, 129, 130, 133, 136, 138, 139, 147, 148, 150, 151, 152, 153, 154, 155, 165, 166, 167, 168, 169, 170, 171, 172, 173, 174, 175, 176, 177, 179, 180, 181, 182, 183, 184, 185, 187, 188, 190, 191, 192, 193, 194. These can be used alone or in combination.

Of these organic azo pigments are especially preferred.

Particularly preferred C.I. Pigment Yellows include Yellow 155 and especially Yellow 74. In our studies we have seen that C.I. Pigment Yellows and C.I. Pigment Yellow 155 and 74 in particular are difficult to disperse to a suitable particle size and with sufficient colloidal stability.

Liquid Medium

For clarification the term liquid medium is used to generically describe the liquid components of the dispersion, the preferences stated for liquid media are especially targeted at dispersions which are ink precursors or pigment concentrates. That is to say dispersions which are suitable for storage and transport and which a customer may use to later prepare inks and ink jet printing inks.

The liquid medium may be wholly organic but preferably is or comprises water (i.e. is aqueous). We have found that the polymeric dispersant according to the first aspect of the present invention is especially suitable as a dispersant for aqueous liquid media.

When the dispersion is an ink precursor it is preferred that the liquid medium is substantially aqueous. For example it is preferred that the liquid medium comprises less than 20%, more preferably less than 10%, especially less than 5% and most especially 0% of water-miscible organic liquids. Such allows the final ink formulator the best possible range of choices for the selection of the types and amounts of water-miscible organic liquids so as to best tune final ink performance to specific hardware needs.

Preferred water-miscible organic liquids for inclusion into the liquid medium include:

i) $C_{1-6}$-alkanols, preferably methanol, ethanol, n-propanol, isopropanol, n-butanol, sec-butanol, tert-butanol, n-pentanol, cyclopentanol and cyclohexanol;

ii) linear amides, preferably dimethylformamide or dimethylacetamide;

iii) water-miscible ethers, preferably tetrahydrofuran and dioxane;

iv) diols, preferably diols having from 2 to 12 carbon atoms, for example ethylene glycol, propylene glycol, butylene glycol, pentylene glycol, hexylene glycol and thiodiglycol and oligo- and poly-alkyleneglycols, preferably diethylene glycol, triethylene glycol, polyethylene glycol and polypropylene glycol;

v) triols, preferably glycerol and 1,2,6-hexanetriol;

vi) mono-$C_{1-4}$-alkyl ethers of diols, preferably mono-$C_{1-4}$-alkyl ethers of diols having 2 to 12 carbon atoms, especially 2-methoxyethanol, 2-(2-methoxyethoxy)ethanol, 2-(2-ethoxyethoxy)-ethanol, 2-[2-(2-methoxyethoxy) ethoxy] ethanol, 2-[2-(2-ethoxyethoxy)-ethoxy]-ethanol and ethyleneglycol monoallylether;

vii) cyclic amides, preferably 2-pyrrolidone, N-methyl-2-pyrrolidone, N-ethyl-2-pyrrolidone, caprolactam and 1,3-dimethylimidazolidone.

Preferably, the liquid medium comprises water and optionally 1 or more, especially optionally from 1 to 3, water-miscible organic liquids.

Optional Cross-Linking

Preferably, the polymeric dispersant is cross-linked around the particulate solid. More specifically, this equates to a dispersion of particulate solid particles, each particle being encapsulated with a cross-linked polymeric dispersant shell.

The cross-linking reaction may cross-link the polymeric dispersant by ionic or more preferably by covalent bonds.

To facilitate cross-linking the polymeric dispersant may itself comprise pairs of co-reactive groups which facilitate cross-linking or the polymeric dispersant may comprise a cross-linkable group and an external cross-linking agent may be added.

The cross-linking reaction may utilise any of the pairs of groups described in PCT patent publication WO 2005/061087 at page 6, Table 1 wherein "reactive groups in the compound" in column 2 can be read as reactive groups in a cross-linking agent.

In the case of the addition of an external cross-linking agent the polymeric dispersant preferably has one or more cross-linkable groups selected from hydroxy, thiol, amine, phosphonic acid and especially carboxylic acid acid groups.

Preferred cross-linking agents include those having isocyanate, aziridine, n-methylol, carbodiimide, oxetane, oxazoline and especially epoxy groups. These reactive groups are particularly useful with dispersants wherein the cross-linkable group in the polymeric dispersant is carboxylic acid groups. A preferred cross-linking agent has epoxy groups, more preferably the epoxy cross-linking agent has no cross-linking groups other than epoxy groups.

Preferred cross-linking agents include sorbitol polyglycidyl ether, glycerol polyglycidyl ether, polyglycerol polyglycidyl ether, pentaerythritol polyglycidyl ether, trimethylolpropane polyglycidyl ether, resorcinol diglycidyl ether, neopentyl glycol diglycidyl ether, 1,6-hexanediol diglycidyl ether, hydrogenated bisphenol A diglycidyl ether, ethylene glycol diglycidyl ether, polyethylene glycol diglycidyl ether, propylene glycoldiglycidyl ether, polypropylene glycol diglycidyl ether, polybutadiene diglycidyl ether. Of these polyethene glycol diglycidyl ether, trimethylolpropane polyglycidyl ether and polyglycerol polyglycidyl ether are preferred. Cross-linking agents of this kind can be obtained commercially under the Denacol™ tradename from Nagasechemtex.

In a preferred embodiment the cross-linking reaction is effected by an epoxy cross-linking agent and the polymeric dispersant has one or more carboxylic acid groups.

Preferably, the cross-linking in step is performed by means of heating the dispersion, preferably to a temperature of from 40 to 100° C. To accelerate or promote the cross-linking reaction it is sometimes useful to add a catalyst.

The pH of the dispersion whilst cross-linking is preferably from 5 to 13, especially from 7 to 12.

When the cross-linking reaction involves epoxy groups it is preferred that the reaction is performed in the presence of a borate salt and/or boric acid.

Preferably, the cross-linking step is performed by a process comprising mixing a composition comprising the following components in the specified proportions:

(a) 30 to 99.7 parts, preferably 50 to 97 parts, of the liquid medium;

(b) 0.1 to 50 parts, preferably 1 to 30 parts, of the pigment;

(c) 0.1 to 30 parts, preferably 1 to 30 parts, of the polymeric dispersant; and (d) 0.001 to 30 parts, preferably 0.01 to 10 parts, of a cross-linking agent.

wherein the parts are by weight.

Preferably, the amount of cross-linking agent used in the cross-linking reaction is stoichiometrically sufficient to reduce the acid value of the polymeric dispersant by 0.1 to 1.5 mmoles, more preferably from 0.1 to 1 mmoles per g of polymeric dispersant. The stoichiometry calculation assumes a 100% efficient reaction between the cross-linking groups in the cross-linking agent and the co-reactive groups in the polymeric dispersant.

Optional Purification

Preferably, the dispersions are purified prior to being formulated into an ink. The purification can be by any suitable method including microfiltration, deionizer resins, centrifugation followed by decantation and washing. A preferred method is membrane filtration especially ultrafiltration.

Inks

According to a third aspect of the present invention there is provided an ink comprising a dispersion according to the second aspect of the present invention and a liquid vehicle. Preferably, the ink is an ink jet printing ink.

By the term liquid vehicle we preferably mean the liquid components of the ink, where the ink is suited to printing, especially ink jet printing.

For inks, especially an ink jet printing inks, the liquid vehicle preferably comprises water and one or more water-miscible organic liquids as previously mentioned. The liquid vehicle may be same as that for the dispersions previously mentioned for the liquid medium but more commonly the liquid vehicle for the ink comprises larger amounts of the previously mentioned water-miscible organic liquids.

It is preferred that the ink comprises water and less than 60% by weight, more preferably less than 50% by weight, even more preferably less than 40%, especially less than 35% and most especially less than 30% by weight of one or more water-miscible organic liquids. It is preferred that the ink comprises at least 1%, more preferably at least 5%, especially at least 10% and most especially at least 15% by weight of one or more water-miscible organic liquids.

We have found that the benefits of the improved colloidal stability provided by the present polymeric dispersants are most pronounced when the amounts of water-miscible organic liquids is relatively high and/or when the water-miscible organic liquids chosen are relatively hydrophobic.

Inks preferably comprise at least one colorant such as a dye or a pigment.

Preferably, in inks the particulate solid is a pigment. Preferably, no other colorant is present in the ink.

Preferably, for ink jet printing the ink has a viscosity of less than 30 mPa·s, more preferably less than 20 mPa·s and especially less than 10 mPa·s. The viscosity is preferably at least 2 mPa·s. Preferably, the viscosity is Newtonian. Preferably, the viscosity is measured at 25° C. Preferably, the viscosity is measured using a shear rate of 100 s$^{-1}$. The viscosity is preferably measured using a cone and plate geometry. A preferred apparatus for measuring the viscosity is a TA Instruments rheometer.

Preferably, the ink comprises:
i) 0.1 to 10 parts, more preferably from 1 to 10 parts of polymeric dispersant according to the first aspect of the present invention;
ii) 0.1 to 10 parts, more preferably from 1 to 10 parts of a pigment (acting as the particulate solid);
iii) 80 to 99.8 parts, more preferably 80 to 98 parts of a liquid vehicle
wherein all parts are by weight.

The ratio of polymeric dispersant to pigment is as hereinbefore preferred.

Preferably, the ink has a surface tension of 20 to 65 dynes/cm, more preferably 30 to 60 dynes/cm, when measured at a temperature of 25° C. The surface tension is preferably measured using a Kibron AquaPi.

The pH of the ink is preferably from 4 to 11, more preferably from 7 to 10.

When the ink is to be used as ink jet printing ink, the ink preferably has a concentration of halide ions of less than 500 parts per million, more preferably less than 100 parts per million. It is especially preferred that the ink has less than 100, more preferably less than 50 parts per million of divalent and trivalent metals. Parts per million as used above refers to parts by weight relative to the total weight of the ink. These low concentrations of ions in the resultant ink can be achieved by the abovementioned purification step.

The ink has preferably been treated so as to remove particles having a particle size of greater than 1 micron. This may be done by centrifugation or filtration.

The ink may optionally contain one of more ink additives. Preferably, the ink further comprises one or more additives selected from viscosity modifiers, pH buffers, metal chelating agents, surfactants, corrosion inhibitors, biocides, dyes, water miscible organic solvent(s) and/or kogation reducing additives.

Preferably, the ink comprises a surfactant, especially a surfactant comprising an acetylenic group. Preferred examples of which include the acetylenic diols and acetylenic ethoxylates. These can be obtained under the tradenames Surfynol™ from Airproducts, preferred examples of which include 465 and 104E.

Cartridge

According to a fourth aspect of the present invention there is provided an ink jet printer cartridge comprising a chamber which contains ink according to the third aspect of the present invention.

Printer

According to a fifth aspect of the present invention there is provided an in jet printer comprising a cartridge according to the fourth aspect of the present invention. The ink jet printer may be of any kind with particular limitation including piezo, thermal, acoustic and electrostatic ink jet printers.

Substrates

According to a sixth aspect of the present invention there is provided a substrate printed with an ink according to the third aspect of the present invention.

The substrate may be of any kind without limitation. Preferred substrates include paper, plastic and textile materials.

Preferred substrates are papers, e.g. plain or treated papers, which may have an acid, alkaline or neutral character. The paper may have an ink jet receptor layer. The receptor layer may be of the swellable or porous kind. Examples of commercially available papers are as described in International patent application No. WO 2007/148035, page 13, line 24 to the end of line 37, which are incorporated herein by reference thereto. Preferably, the substrate is a plain paper. Preferably, the substrate does not contain an ink fixative. Examples of ink fixatives which are preferably absent include cationic organic amines and cationic polymers.

Use

According to seventh aspect of the present invention there is provided the use of a polymeric dispersant according to the first aspect of the present invention for preparing an ink jet printing ink.

EXAMPLES

The present invention will now be illustrated by the following non-limiting examples in which all parts are by weight unless indicated to the contrary.

1. Preparation of Neutralised Polymeric Dispersant Solution—(E1)

1.1 Preparation of Polymeric Dispersant Solution (DS1)

The monomers benzyl methacrylate (233.05 g, 1322.57 mmoles), propylene glycol methacrylate (17.15 g, 118.96 mmols) and methacrylic acid (38.21 g, 443.84 mmoles) were mixed together along with and a chain transfer agent butyl 3-mercaptopropionate (6.80 g, 41.91 mmoles). The mixture of monomers and the chain transfer agent were then dissolved in diproylene glycol (110.66 g) to give a monomer feed.

A thermal initiator, Trigonox 21S (4.80 g) was dissolved in diproylene glycol (147.56 g) to give an initiator feed.

Dipropylene glycol (191.79 g) was warmed to 85° C. in a reaction vessel. The reaction vessel was purged by bubbling in nitrogen gas. Whilst stirring the contents of the reaction vessel, the monomer and initiator feeds were added over 4 and 5 hours respectively. The temperature of the reactor vessel was maintained at 85° C. (+/−1° C.) throughout. The inert nitrogen gas blanket was also maintained over this period. On completion of the feeds the contents of the reactor vessel were stirred for a further 1 hour at 85° C. These steps polymerised the monomers to prepare the polymeric dispersant (D1) in the form of a 40% by weight solution in dipropylene glycol.

The molecular weight of the polymeric dispersant (D1) as measured by gel permeation chromatography using a DMF solvent and polystyrene standards was Mn (number average)

20,600 and Mw (weight average) 31,200. Thus, step 1 resulted in the preparation of polymeric dispersant solution (DS1).

1.2 Polymer Neutralisation

The polymeric dispersant solution (DS1) prepared above in step 1.1 (750 g) was neutralised by the addition of a solution containing 45% aqueous potassium hydroxide (44.29 g) and water (773.36 g) to give a solids content of 20% by weight. This prepared neutralised polymeric dispersant solution (E1).

1.3 Preparation of Comparative Neutralised Polymeric Dispersant Solutions

A series of comparative neutralised polymeric dispersant solutions CE1 to CE4 were prepared exactly as in previous steps 1.1 and 1.2 except that the monomer compositions indicated in Table 1 were used in place of those specified in step 1.1 and the amount of potassium hydroxide was adjusted.

TABLE 1

| Ref | Benzyl methacrylate (BzMA) | propylene glycol methacrylate (PGMA) | Poly propylene glycol methacrylate | methacrylic acid | KOH 45% aqu |
|---|---|---|---|---|---|
| CE1 | 238.8 g | 0 | 0 | 49.6 g | 57.76 |
| CE2 | 226.2 g | 0 | 0 | 62.2 g | 68.53 |
| CE3 | 231.6 g | 0 | 19.3 g | 37.6 g | 43.68 |
| CE4 | 211.1 g | 0 | 40.9 g | 36.4 g | 42.29 |

Table 1, monomers compositions for comparative neutralised polymeric dispersant solutions CE1 to CE4.

2. Preparation of Mill-Bases and Comparative Mill-Bases 2.1 Preparation of Mill-Base (1)

Pigment powder (22 g of TRY13—C.I. Pigment Yellow 74 pigment ex DainichiSeika Color Chemicals Mfg), neutralised polymeric dispersant solution E1 (55 g) and water (23 g) were mixed together to form a premixture.

The premixture was transferred to a horizontal recirculating bead mill (Netzsch) containing 1 mm polymeric beads and milled for 45 minutes. After the initial milling the mixture was transferred to another horizontal recirculating bead mill (Netzsch) containing 0.3 mm polymeric beads. The mixture was then milled for 10 hours. The resultant dispersion was pumped off from the beads and adjusted to a solids content of 10% by weight of pigment by the addition of pure water. This was designated Mill-base (1). The pigment particles in the resulting mill-base had a Z-average particle size of 89 nm, as measured using a Malvern Zetasizer™.

2.2 Preparation of Comparative Mill-Bases (1) to (4)

Comparative Mill-bases (1) to (4) were prepared in exactly the same way as Mill-base (1) except that neutralised polymeric dispersant solutions CE1 to CE4 were used in place of E1. The exact correspondence was as indicated in Table 2.

TABLE 2

| Neutralised Pigment Dispersion Solution | Mill-base |
|---|---|
| E1 | Mill-base (1) |
| CE1 | Comparative Mill-base (1) |
| CE2 | Comparative Mill-base (2) |
| CE3 | Comparative Mill-base (3) |
| CE4 | Comparative Mill-base (4) |

3. Preparation of Dispersions of Encapsulated Pigments 3.1 Preparation of Encapsulated Pigment Dispersion (EPD1)

The dispersant in Mill-base (1) as prepared in step 2.1 was then cross-linked using the cross-linking agent Denacol EX521 (supplied by Nagase). This covalently cross-linked the carboxylic acid groups in the dispersant and thereby encapsulated the pigment particles. The cross-linking reaction was controlled by the presence of boric acid (obtained from Aldrich). A mixture of Mill-base (1) (450 g), Denacol EX521 (0.965 g) and boric acid (0.278 g) was prepared. The cross-linking reaction was effected by heating the above described mixture to a temperature of about 65° C. for 5 hours. This prepared encapsulated pigment dispersion (EPD1).

3.2 Preparation of Comparative Encapsulated Pigment Dispersions CEPD1 to CEPD4

Comparative encapsulated pigment dispersions were prepared exactly as described in step 3.1 except that Mill-base (1) was replaced with a comparative Mill-base. In addition, the type of cross-linking agent, the amounts of cross-linking agent and the amounts of boric acid were also adjusted. The exact amounts were as indicated in Table 3.

TABLE 3

| Encapsulated pigment dispersion | Comparative mill-base | Cross-linking agent Type | Amount of cross-linking agent (g) | Amount of Boric acid (g) |
|---|---|---|---|---|
| CEPD1 | CE1 | EX321 | 0.945 | 0.415 |
| CEPD2 | CE2 | EX321 | 1.575 | 0.695 |
| CEPD3 | CE3 | EX521 | 2.407 | 0.697 |
| CEPD4 | CE4 | EX521 | 0.965 | 0.278 |

4. Ultrafiltration

Encapsulated pigment dispersions as prepared above in step 3.1 and 3.2 were purified by means of ultrafiltration using a membrane having a 50 kD pore size. Each encapsulated pigment dispersion was diafiltered with approximately 10 wash volumes of pure deionized water per 1 volume of the encapsulated pigment dispersion. The ultrafiltration membrane was then used to concentrate each encapsulated dispersion back to a solids content of around 10% by weight.

5. Ink Preparation 5.1 Ink 1

Purified EPD 1 as prepared above in step 4 was diluted into the following ink formulation to prepare Ink 1:

| Ethylene glycol | 15.00 g |
| Triethylene glycol monobutyl ether | 10.00 g |
| Surfynol ™ 465 | 0.7 g |
| Purified EPD 1 | 50 g |
| Water | 24.3 g |

5.2 Comparative Inks 1 to 4

Comparative Inks 1 to 4 where prepared in the same way as Ink 1 except that the purified comparative encapsulated pigment dispersions CEPD1 to CEPD4 were used.

6. Tests Methods 6.1 Average Particle Size by Light Scattering

The average particle size of the particles in each ink was measured using a Malvern Zetasizer™ (to record the Z-average value), and a Nanotrac instrument from Microtrac Inc. (to record the My average value).

6.2 Single Particle Optical Sensing (SPOS)

The number of particles having a particle size of greater than 0.5 microns was measured using single particle optical sensing. The apparatus used was an Accusizer™ 780-APS. All samples were measured after being diluted to 1% by weight of pigment in the ink.

The inks were stored in sealed bottles in an oven at 60° C. for 4 weeks. The inks were allowed to cool and the measurements repeated.

6.3 Sedimentation

The amount of sediment in a sample of the ink was determined visually by inspecting the bottom of a clear storage bottle for signs of sediment. The ratings were 0—none, 1—trace amounts, 2—slight amounts, 3—med and 4—extensive amounts of sedimentation.

7. Testing Methodology

For each initial ink all of the tests 6.1 to 6.3 were applied. The inks were then stored for 4 weeks at a temperature of 60° C. and the tests were repeated. The results are shown below in Table 4.

Delta Mv ave is given by Mv average after storage—Mv average initial;

Delta Z-ave is given by Z-average after storage—Z-average initial;

The SPOS result is taken from the samples after the storage test. The Ratio SPOS value is given by the SPOS value after storage divided by the initial SPOS value.

The sediment score is taken directly from the sample after storage. All samples showed no sediment initially.

Results

TABLE 4

| Ink | Neutralised Dispersant Solution | Delta -Mv ave | Delta Z-ave | Ratio SPOS >0.5 microns | Sediment score |
|---|---|---|---|---|---|
| Ink 1 | E1 | 0 | 0 | 0.79 | 0 |
| Comparative Ink 1 | CE1 | 0 | 15 | 6.2 | 3 |
| Comparative Ink 2 | CE2 | 15 | 20 | 13.6 | 2 |
| Comparative Ink 3 | CE3 | 13 | 12 | 10.4 | 1 |
| Comparative Ink 4 | CE4 | 6 | 9 | 2.2 | 3 |

As can clearly be seen, Ink 1 had far better colloidal stability than any of the Comparative Inks 1 to 4. Thus, the dispersants according to the present invention provide dispersions and inks having excellent colloidal stability even with difficult pigments such as C.I. Pigment Yellow 74, even at higher storage temperatures of 60° C. and even in inks with more hydrophobic liquids such as triethyleneglycol monobutyl ether.

The invention claimed is:

1. A polymeric dispersant obtained or obtainable by copolymerising a monomer composition comprising at least the components:
   i) benzyl (meth)acrylate;
   ii) propylene glycol (meth)acrylate;
   wherein the weight ratio of component i) to component ii) is greater than 10:1.

2. The polymeric dispersant according to claim 1 wherein the weight ratio of component i) to ii) is from 11:1 to 100:1.

3. The polymeric dispersant according to claim 1 wherein the weight ratio of component i) to ii) is from 11:1 to 50:1.

4. The polymeric dispersant according to claim 1 wherein:
   component i) is present at from 40 to 95 parts;
   component ii) is present at from 0.1 to 9 parts;
   wherein all parts are by weight.

5. The polymeric dispersant according to claim 1 wherein the monomer composition further comprises:
   iii) one or more ethylenically unsaturated hydrophilic monomers each having one or more ionic groups.

6. The polymeric dispersant according to claim 5 wherein component iii) is or comprises methacrylic acid.

7. The polymeric dispersant according to claim 1 wherein the monomer composition comprises no more than 2 parts by weight of macromonomer and the sum of all the parts of the monomer components is 100 parts by weight.

8. A dispersion comprising a particulate solid, a liquid medium and a polymeric dispersant according to claim 1.

9. The dispersion according to claim 8 wherein the polymeric dispersant is cross-linked around the particulate solid.

10. The dispersion according to claim 9 wherein the particulate solid is a pigment.

11. An ink comprising a dispersion according to claim 10 and a liquid vehicle.

12. The ink of claim 11 being an ink jet printer ink.

13. The dispersion according to claim 10 wherein the pigment is C.I. Pigment Yellow 74 and/or C.I. Pigment Yellow 155.

14. An ink jet printer cartridge comprising a chamber and an ink, wherein the ink is as defined in claim 11 and the chamber contains the ink.

15. A polymeric dispersant according to claim 1 wherein:
   (a) the weight ratio of component i) to ii) is from 11:1 to 50:1;
   (b) component i) is present at from 40 to 95 parts; and component ii) is present at from 0.1 to 9 parts; wherein all parts are by weight;
   (c) the monomer composition further comprises: iii) one or more ethylenically unsaturated hydrophilic monomers each having one or more ionic groups; and
   (d) component iii) is or comprises methacrylic acid.

16. A dispersion comprising a particulate solid, a liquid medium and a polymeric dispersant according to claim 15.

17. The dispersion according to claim 16 wherein the polymeric dispersant is cross-linked around the particulate solid.

18. The dispersion according to claim 16 wherein the particulate solid is a pigment.

19. An ink comprising a dispersion according to claim 18 and a liquid vehicle.

20. The ink according to claim 19 being an ink jet printer ink.

21. A polymeric dispersant comprising a polymer of at least:
   i) benzyl (meth)acrylate monomer; and
   ii) propylene glycol (meth)acrylate monomer;
   wherein the weight ratio of component i) to component ii) is greater than 10:1.

22. The polymeric dispersant of claim 21 wherein:
   component i) is present at from 40 to 95 parts;
   component ii) is present at from 0.1 to 9 parts;
   wherein all parts are by weight.

23. The polymeric dispersant of claim 21 wherein the polymer further comprises:
   iii) one or more ethylenically unsaturated hydrophilic monomers each having one or more ionic groups.

24. The polymeric dispersant of claim 23 wherein component iii) is methacrylic acid.

* * * * *